May 13, 1958

J. B. WINTHER 2,834,936

TUBE ANALYZER

Filed Nov. 23, 1956

Jerrold B. Winther,
Inventor.
Koenig and Pope,
Attorneys.

United States Patent Office 2,834,936
Patented May 13, 1958

2,834,936

TUBE ANALYZER

Jerrold B. Winther, Kenosha, Wis.

Application November 23, 1956, Serial No. 623,994

7 Claims. (Cl. 324—27)

This invention relates to tube analyzers and more particularly to phanotron tube analyzers.

Among the several objects of the invention may be noted the provision of a tube analyzer for determining the condition of a phanotron tube; the provision of an analyzer which may be operated and the test results easily interpreted by nontechnical personnel; the provision of such an analyzer which permits observation of tube characteristics under static or dynamic conditions; and the provision of phanotron tube analyzers which are economical in cost and reliable in operation. Other objects and features will be in part apparent and in part pointed out hereinafter.

The invention accordingly comprises the constructions hereinafter described, the scope of the invention being indicated in the following claims.

Figure 1:
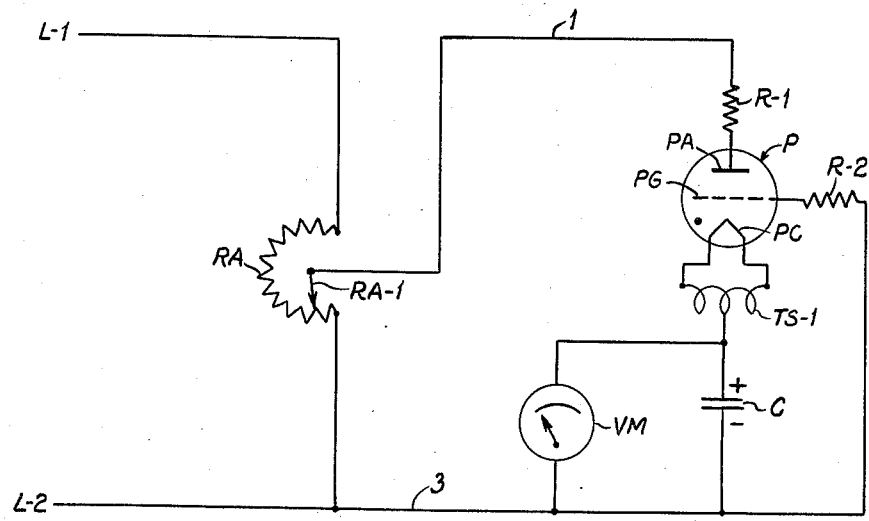
Figure 2:
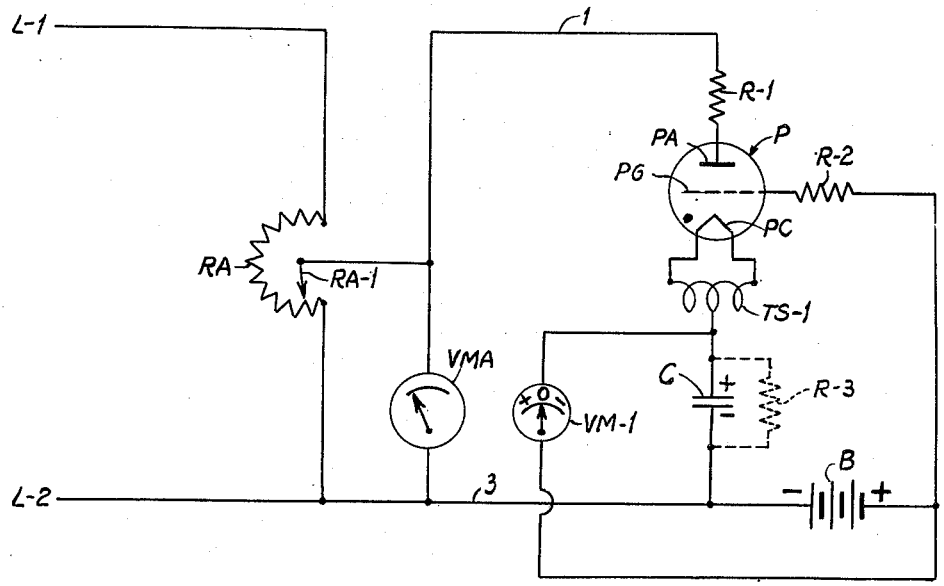

In the accompanying drawings, in which several of various possible embodiments of the invention are illustrated, Fig. 1 is a circuit diagram of a phanotron tube analyzer of the present invention; and, Fig. 2 is a circuit diagram of a second phanotron tube analyzer embodiment of the present invention.

Corresponding reference characters indicate corresponding parts throughout the several views of the drawings.

Referring now to the drawings and more particularly to Fig. 1, a phanotron tube is indicated generally at P. By phanotron tube I mean any gas-filled electronic tube having a thermionic cathode and an anode, and which may or may not have one or more additional electrodes, such as a control grid for controlling unidirectional current flow. Phanotron tube P may be, for example, a thyratron type gaseous discharge tube including a control grid PG, an anode PA and a cathode PC. Cathode PC is illustrated as being a directly heated type, energized by a transformer secondary TS–1. An A. C. voltage source L–1, L–2 is connected across a variable resistor or potentiometer RA. A variable A. C. voltage source is thereby provided across a rotor RA–1 and line L–2. An electrical circuit including this variable A. C. voltage source interconnects cathode PC and anode PA by means of wires 1 and 3 (and any of the customary means, such as a tube socket, for receiving a tube to be tested) to establish a variable A. C. potential between these two electrodes. The electrical connection to the cathode PC by wire 3 is completed through a condenser C and a center tap of transformer secondary TS–1. A voltmeter VM is shunt-connected across condenser C. The electrical connection to anode PA by wire 1 is completed through a resistor R–1.

A second electrical circuit interconnects grid PG and cathode PC through a grid leak resistor R–2. This second circuit includes (in common with the anode-cathode electrical circuit) condenser C and the shunt-connected voltmeter VM.

Operation is as follows:

With rotor RA–1 set as illustrated, a minimum A. C. potential is established between anode PA and cathode PC. Under these conditions, the phanotron tube P under test will not conduct. Conduction is instituted by slowly advancing rotor RA–1 in a clockwise direction to increase the A. C. anode-cathode potential to a level sufficiently high to cause tube P to fire. As soon as this occurs, the resultant current flow through tube P will cause condenser C to charge. For the first few conduction or firing cycles condenser C will charge until the potential established across its plates, having a polarity as indicated, reaches a value equal to that necessary to cause tube P to cease firing. This potential thus established between the cathode and grid is known as the critical grid voltage.

Condenser C and resistor R–1, as well as the effective resistance of RA, constitute an RC circuit, the charging time of which is a function of these parameters. However, this time is quite short and in a practical sense the critical grid voltage, i. e., the voltage necessary to cause tube P to cease conducting at any particular anode-cathode voltage, is developed across C and is visually continuously indicated on the face of voltmeter VM.

The internal resistance of voltmeter VM is an operating element of the present apparatus, inasmuch as this resistance in combination with the capacitance of condenser C forms a second RC circuit which establishes the discharge time of condenser C. Thus, if arm RA–1 is moved to a predetermined setting the tube P will initially conduct for a few cycles until the critical grid voltage is developed across condenser C, and tube P will then cease conducting for a period set by the time constant of the second RC circuit. When the voltage across condenser C drops below the critical voltage figure due to this discharge, then tube P will again conduct for a cycle or so, until the condenser is recharged to a potential equal to or in excess of the critical grid voltage.

As the arm RA–1 is moved to a further clockwise position, the charge or potential on condenser C readjusts itself automatically to the new condition, the corresponding critical grid-cathode voltage being indicated on VM. The tube analyzer is thus self-regulating and the potential as indicated by voltmeter VM hovers at the trigger point or the critical grid voltage. For the average phanotron tube, this voltage is in the order of about —3 v.

The grid leak resistor R–2 performs its usual function, while the inclusion of resistor R–1 is desirable as it prevents overcharging of condenser C during the first A. C. cycle of any conducting period.

Referring now to Fig. 2, a battery B is shown connected in the second electrical circuit between grid PG and condenser C. Voltmeter VM–1, preferably of the zero-centered type, is shunt-connected across both condenser C and battery B. A second voltmeter VMA is connected from L–2 to the potentiometer arm RA–1. This voltmeter serves to indicate the A. C. anode-cathode potential. As the conventional A. C. voltmeter is calibrated to record r. m. s. values, VMA is specifically recalibrated to record maximum voltage values (1.414 times r. m. s.).

Operation of this Fig 2 embodiment is substantially identical to that of the Fig. 1 apparatus, except that the critical grid-cathode voltage is established as a net or composite voltage made up of the potential developed across condenser C in series opposition with the potential supplied by battery B. This arrangement is particularly advantageous in that a malfunctioning phanotron tube requiring a positive grid potential can be tested. Therefore, in this embodiment, the cathode-grid voltage of the tube P will hover at the critical value (indicated as a plus or a minus potential on meter VM–1) established by the potential across condenser C minus the potential of battery B.

A third resistor R–3 is shown in dashed lines in Fig. 2 shunt-connected across C. This resistor, which may be a conventional resistor (preferably having a resistance in the order of that of meter VM–1), may be connected in the circuit if desired. The purpose of this shunt resistance across C is to take care of the special case where RA–1 is set to 0 (maximum counterclockwise position) which would after some time permit C to charge to the potential of battery B and provide a net or composite voltage of 0 between grid PG and cathode PC. By connecting a resistance such as R–3 across C, the potential across C (in this special case where the anode-cathode voltage is 0) cannot rise to the level of B, and a positive voltage is thereby asured at PG. In practice, this condenser may be eliminated or the inherent leakage resistance of C may effectively provide this shunt resistance.

As exemplary circuit parameters, condenser C is preferably in the order of 1000 microfarads, while R–1 may be about 10,000 to 30,000 ohms and R–2 is in the usual range of grid leak resistor values, i. e., 20,000 to 100,000 ohms. The A. C. anode-cathode potential should be adjustable from about zero to 600 v., while battery B (or a conventional equivalent bias power supply) should provide in the order of about 4 v. The internal meter resistance of VM should be approximately 10,000 ohms. It will be understood that none of these values, with the possible exception of condenser C, are critical, but they merely represent exemplary preferred values. It is important that the capacitance of condenser C be quite high, as a value of a few microfarads will not suffice.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A phanotron tube analyzer comprising means adapted to receive a phanotron tube to be tested, said tube having a control grid and an anode and a cathode, a first electrical circuit including a variable A. C. voltage source interconnecting said cathode and anode to establish an A. C. potential therebetween, means for varying said A. C. potential, a condenser series-connected in said first circuit between said voltage source and said cathode, a second electrical circuit interconnecting said grid and said cathode and commonly including said condenser, and a voltmeter having a predetermined meter resistance shunt-connected across said condenser, said condenser being responsive to variation in said A. C. anode-cathode potential to impress a potential across said cathode-grid circuit substantially equal to the critical grid-anode voltage of said phanotron which is thereby indicated by said voltmeter.

2. A phanotron tube analyzer as set forth in claim 1 which further includes a resistor series-connected in said first circuit between the anode and said A. C. voltage source, and a grid leak resistor series-connected in said second circuit between the grid and the condenser.

3. A phanotron tube analyzer as set forth in claim 2 in which the capacitance of the condenser is in the order of one thousand microfarads.

4. A phanotron tube analyzer comprising means adapted to receive a phanotron tube to be tested, said tube having a control grid and an anode and a cathode, a first electrical circuit including a variable A. C. voltage source interconnecting said cathode and anode to establish an A. C. potential therebetween, means for varying said A. C. potential, a condenser series-connected in said first circuit between said voltage source and said cathode, a second electrical circuit interconnecting said grid and said cathode and commonly including said condenser, a D. C. voltage source series-connected in the second circuit and having a terminal of positive polarity connected to said grid and a terminal of negative polarity connected to said condenser, and a voltmeter having a predetermined meter resistance shunt-connected across said series-connected condenser and D. C. voltage source, said condenser being responsive to variation in said A. C. anode-cathode potential to develop a potential which in combination with the potential of said D. C. voltage source produces a composite potential across said cathode-grid circuit substantially equal to the critical grid-anode voltage of said phanotron which is thereby indicated by said voltmeter.

5. A phanotron tube analyzer as set forth in claim 4 which further includes a resistor series-connected in said first circuit between the anode and said A. C. voltage source, and a grid leak resistor series-connected in said second circuit between the grid and said positive-polarity terminal.

6. A phanotron tube analyzer as set forth in claim 5 in which the capacitance of said condenser is in the order of one thousand microfarads.

7. A phanotron tube analyzer as set forth in claim 5 which further includes means for indicating the value of said anode-cathode potential electrically connected in shunt across said variable A. C. voltage source.

No references cited.